United States Patent [19]

Brosow

[11] 4,165,445

[45] Aug. 21, 1979

[54] CIRCUIT FOR PREVENTING ACOUSTIC FEEDBACK

[75] Inventor: Jörgen Brosow, Hof, Austria

[73] Assignee: Dasy Inter S.A., Geneva, Switzerland

[21] Appl. No.: 862,673

[22] Filed: Dec. 21, 1977

[30] Foreign Application Priority Data

Dec. 27, 1976 [DE] Fed. Rep. of Germany ....... 2659028

[51] Int. Cl.[2] .............................................. H04M 1/20

[52] U.S. Cl. ............................... 179/1 HF; 179/1 FS

[58] Field of Search ................ 179/1 D, 1 HF, 1 AT, 179/1 FS

[56] References Cited

U.S. PATENT DOCUMENTS 3,296,373 1/1967 Suganuma ............................ 179/1 P 3,934,085 1/1976 Munson et al. ....................... 179/1 P 3,975,588 8/1976 Besseyre et al. ................... 179/1 FS

*Primary Examiner*—Kathleen H. Claffy

*Assistant Examiner*—E. S. Kemeny

*Attorney, Agent, or Firm*—Hammond & Littell

[57] ABSTRACT

This hands-free telephone prevents acoustic feedback between its speaker and microphone by attenuating either the transmission or receive path under the control of a corresponding pair of counters (computers), each counter sensing the signal divided and digitized from its corresponding path. An increase in counted pulses indicates feedback and causes a counter to more quickly reach a predetermined counter state (count), to trigger attenuation (damping) before it can be reset (restored) to zero by the other counter.

11 Claims, 4 Drawing Figures

CIRCUIT FOR PREVENTING ACOUSTIC FEEDBACK

BACKGROUND OF THE INVENTION

The invention relates to a circuit arrangement for preventing feedback on devices, each provided with at least one microphone and a loudspeaker. The invention is, in particular, suitable for loudspeaker installations and so-called "free-speakers" or "hands free telephones". Instead of this, it can also be employed for power amplifiers and the like.

Everywhere where, due to sound transmission, times occur, such as, for example, in the case of loudspeaker installations wherein the microphone takes up the dying-away sound of the loudspeaker, there are frequently acoustic feedbacks and feedback whistle of the installation. Such feedbacks are extremely disturbing and should as far as possible be eliminated without this causing disadvantages to the user. For this it is known to so down regulate the amplifier that the feedbacks are avoided. This causes, however, detrimental influencing of the capacity which per se is possible. Additionally, manual control is necessary.

OBJECTS OF THE INVENTION

Thus, it is the object of the invention to construct an automatic circuit which responds with high velocity and which reliably prevents feedbacks in devices and installations of the type mentioned above.

Another object of the present invention is the development of a circuit for preventing acoustic feedback in devices provided with at least one microphone and at least one loudspeaker and optionally at least one telephone input transformer comprising a signal circuit wherein the output signal fed to the loudspeaker is divided, the divided output signal is fed to at least one digital converter cooperating with a computer, the digital output signal is supplied to a computer cooperating with said at least one digital converter, the input signal fed from said at least one microphone is divided, the divided input signal is fed to at least one digital converter cooperating with a computer, the digital input signal is supplied to a computer cooperating with said at least one digital converter, at least one of said computers on reaching a predetermined counter state supplies a signal to a damping element and another of said computers on reaching a predetermined counter state supplies a signal to reset one of said computers to a zero state, whereby when the input signal exceeds the output signal, the damping element is activated.

These and other objects of the invention will become more apparent as the description thereof proceeds.

THE DRAWINGS

Figure 1:
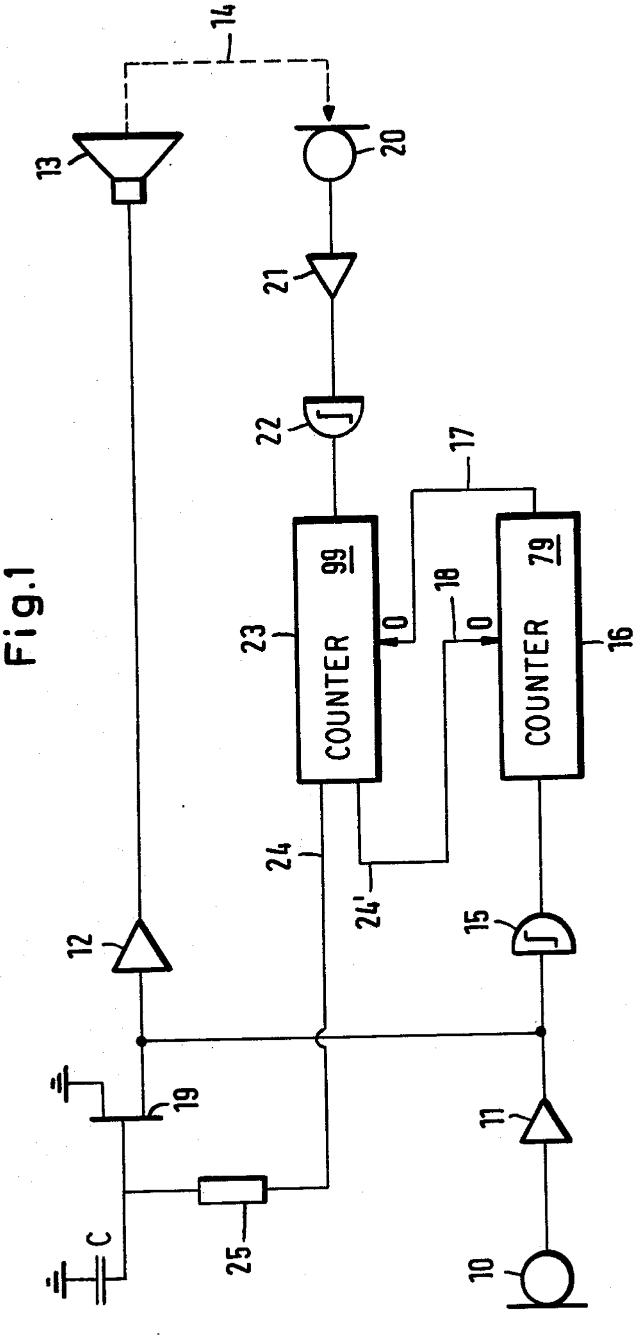
Figure 2:
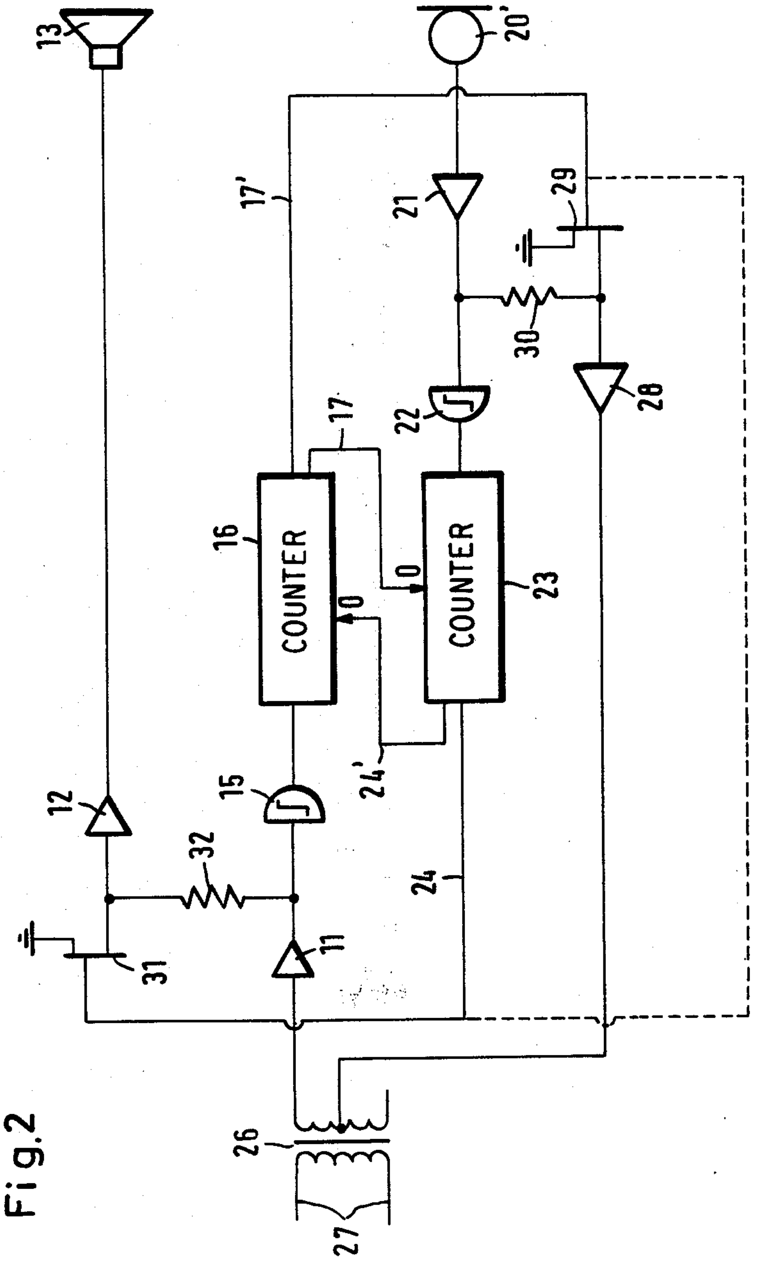
Figure 3:
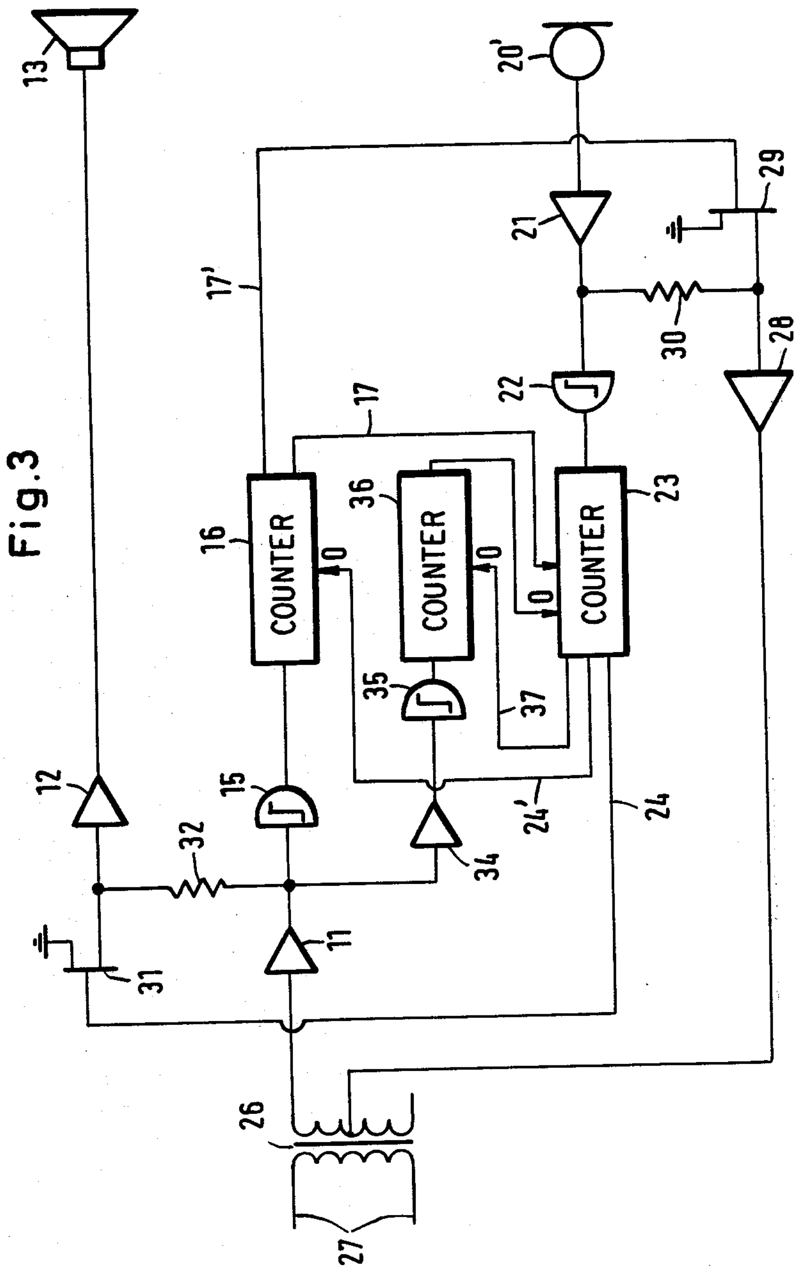
Figure 4:
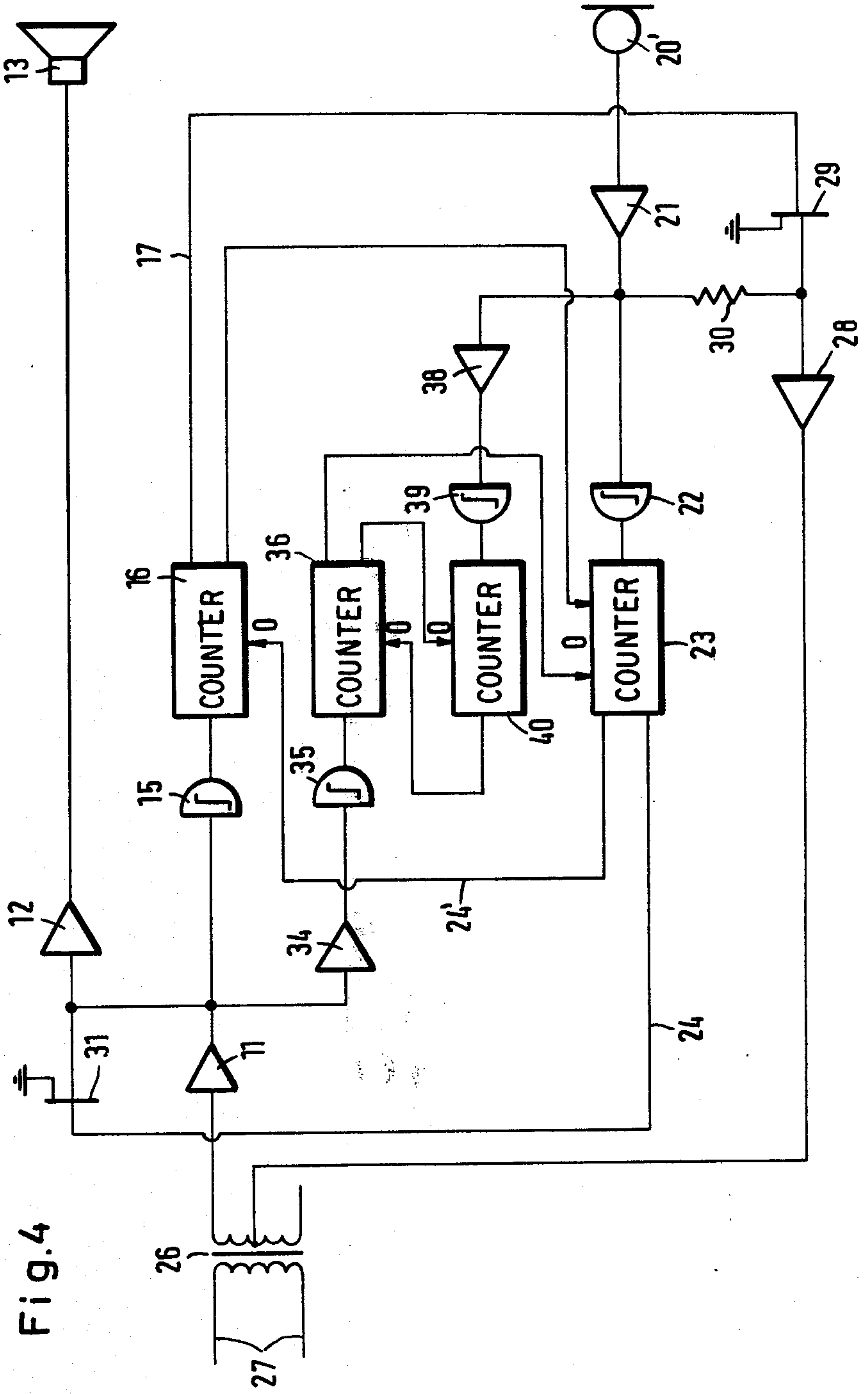

FIG. 1 is a block circuit diagram of a loudspeaker installation with a circuit of the invention, FIG. 2 is a block circuit diagram of a "free-speaker" with computer control of the possibility for cross-speaking of the caller, FIG. 3 shows an improved embodiment of the free-speaker with intermediate speech possibility of the caller even if there is a high degree of background noise in the space in which the free-speaker is set up, and FIG. 4 shows a further improved embodiment of the free-speaker.

DESCRIPTION OF THE INVENTION

According to the present invention, the problems of acoustic feedback have been solved and the above objects achieved (1) in that the signals fed to the loudspeaker are digitalized and introduced into a first computer (counter), (2) in that the signals travelling in from the microphone are introduced in digitalized form into a second computer (counter), (3) in that at least one of the two computers, for example the second computer, on attaining a pre-determined counter state, triggers a damping element, and that the other computer, for example the first of the two computers, sets back the first computer to zero on attaining a pre-determined counter state.

More particularly, the present invention relates to a circuit for preventing acoustic feedback in devices provided with at least one microphone and at least one loudspeaker and optionally at least one telephone input transformer comprising a signal circuit wherein the output signal fed to the loudspeaker is divided, the divided output signal is fed to at least one analog-digital converter cooperating with a computer, the digital output signal is supplied to a computer cooperating with said at least one analog-digital converter, the input signal fed from said at least one microphone is divided, the divided input signal is fed to at least one analog-digital converter cooperating with a computer, the digital input signal is supplied to a computer cooperating with said at least one analog-digital converter, at least one of said computers on reaching a predetermined counter state supplies a signal to a damping element and another of said computers on reaching a predetermined counter state supplies a signal to reset one of said computers to a zero state, whereby when the input signal exceeds the output signal, the damping element is activated.

Such a device is especially suitable for controlling or preventing feedbacks, in particular of acoustic feedbacks, because it responds not only to the signals which per se are to be transmitted but also responds rapidly and in reliable fashion to additionally acting signals, such as reverberation or the like. Depending on the type of input, either the first or the second computer operates more rapidly. As long as the computer not triggering the damping element operates, it returns the computer triggering the damping element to zero again and again, so that damping does not occur. As soon, however, as there is an indication of feedback by an increase in counted pulses, the other computer commences to count operate more rapidly and reaches its predetermined counter state triggering a damping signal before it is restored to zero by the first computer. The damping does not allow the feedback. With this arrangement, the damping is automatically again cancelled when there is no longer any danger of feedbacks. Thus, there is obtained a simply constructed circuit arrangement which, nevertheless, reliably prevents feedbacks.

Further details, advantages and features of the invention will be apparent from the drawings. In the said drawings, the invention is discussed with reference to various examples of embodiment and in these drawings:

FIG. 1 shows the block circuit diagram of a loudspeaker installation with the circuit of the invention, FIG. 2 shows the block circuit diagram of a "free-speaker" or "hands off telephone" with computer control of the possibility for cross-speaking of the caller, FIG. 3 shows an improved embodiment of the free-speaker with intermediate speech possibility of the caller even if there is a high degree of background noise in the space in which the free-speaker is set up, and FIG. 4 shows a further improved embodiment of the free-speaker.

Devices for preventing acoustic feedbacks via sound are necessary in telephone installations, in particular in the case of free-speakers or hands free telephones, for preventing feedback whistle. Acoustic feedback control of this type affords, however, advantages also in the case of loudspeaker installations in halls, churches or the like and also, for example, in the case of amplifier installations such as are employed at shows and other musical performances.

FIG. 1 shows the most simple solution according to the invention, for the automatic preventing of acoustic feedbacks due to the employment of a computer control. What is concerned is a loudspeaker installation having computer control and an auxiliary microphone. The microphone 10 is the microphone of the loudspeaker installation. This microphone is used by the speaker or that person whose acoustic sounds, such as speaking, singing, playing music, are to be amplified by the loudspeaker installation. The output signal of the microphone 10 is supplied to a pre-amplifier 11 and, via a final amplifier 12 fed to a loudspeaker 13 which serves as electric-acoustic transducer of the signal and radiates sound as indicated by the dotted arrow 14.

The output signal of the pre-amplifier 11 is, however, fed not only to the end amplifier 12 but, via a analog-digital converter or pulse former 15, also to a counter or computer 16. The pulse former 15 serving as digitalization stage transduces the amplitude-modulated signal, such as it is received by the microphone 10 and the pre-amplifier 11, to a digital signal information in which the pulse density or chronological pulse frequency is a function of the intensity of the sound waves acting on the microphone 10 or the amplitude development in the output signal of the pre-amplifier 11. The output signal of the pulse former 15 is thus a digital information representative for the sound effect on the microphone 10. This is fed as input signal to the computer 16. What is concerned in this case is a counter. This counter is so designed that, on reaching a pre-set counter state, for example 79, it transmits an output signal to the control line 17 and recommences to count from zero. The computer 16 is, therefore, not a fully-running counter which maintains its counter state until it is set at zero from the exterior, but a rotating counter which on reaching the maximum counter state once again begins to count at zero. Apart from this automatic possibility for restoring, the computer 16 can also be set at zero from the exterior via its control input 18. This will be discussed later.

The connecting point of the pre-amplifier 11 and the pulse former 15 is furthermore connected to earth via a variable resistor. In FIG. 1, as variable resistor a field effect transistor 19 is shown. The field effect transistor 19 is so wired that it normally only slightly damps the connecting point of pre-amplifier 11 and pulse former 15. Also, then, the signal feed line to the loudspeaker 13 is only slightly damped. If, however, a signal is applied to the gate of the field effect transistor 19, then the damping is amplified and therewith the sound level of the sound radiation of the loudspeaker 13 (arrow 14) is reduced.

Self-control of the sound radiation of the loudspeaker 13 due to the loudspeaker installation shown in FIG. 1 is now effected in the following manner: Additionally to the microphone 10 which represents the main microphone of the loudspeaker installation, there is provided an auxiliary microphone 20. This is arranged in spaced relationship from the microphone 10, so that the sound taken up by the main microphone cannot pass directly to the auxiliary microphone 20. The auxiliary microphone 20 then takes up substantially only the radiated sound of the loudspeaker 13. This, in the auxiliary microphone 20, is converted to an electrical signal which is transmitted via an amplifier 21 and a pulse former 22 to a computer 23, as discussed hereinabove for signal feed-in into the computer 16 with the aid of the microphone 10, the pre-amplifier 11 and the pulse former 15.

The computer 23 is a computer of the same type as the computer 16. Also when its predetermined counter end state is reached, it supplies an output signal to a control line 24. The latter is connected with the gate of the field effect transistor 19. A further control line 24' is connected with the control input 18 for setting to zero of the computer 16. Additionally, the control input for setting to zero of the computer 23 may be connected with the output of the computer 16 via control line 17. It is, however, also possible to employ as computer 23 a counter which on reaching the counter end state not only restores the counter 16 to zero, but also itself again at zero begins to count so that both computers always begin to count simultaneously at zero.

Since the signal taken up by the microphone 10, due to the faithful speech imitation by the loudspeaker 13, corresponds substantially to the signal taken up by the auxiliary microphone 20, it is possible to start from the fact that substantially the same input signals are fed to the computers 16 and 23, although the signal infeed into the computer 23 is delayed relative to that into the computer 16, due to the longer signal running times. The digital information fed to the computer 23 is therefore substantially identical but chronologically delayed relative to the digital information fed to the computer 16.

It is possible to proceed in such manner that the computer 23 is given a greater counter end condition than the computer 16. For example, the computer 23 is so designed that it only transmits a signal to the control line 24 on reaching the counter state 99, whereas the computer 16 supplies a signal to the control line 17 already reaching the counter state 79, thereby restoring the computer 23 to zero. With such design of the counter, the computer 16 will normally reach its counter end condition and supply a signal to the control line 17 before the counter constituting the computer 23 has fully counted to its preset end state. At this instant, however, there already takes place zero setting of both counters, so that the computer 23 does not supply any output signal to the control line 24. Both counters are again restored to zero and begin their working cycle from the outset. Damping of the signal feed to the loudspeaker 13 does not occur or occurs only to the previously set and desired extent.

If, by reason of reverberation, echo or for other reasons, there is a risk of feedbacks of the radiation of the loudspeaker 13 to the microphone 10, then these are prevented in the following manner. If as the result of the reverberation, the microphone 20 takes up, for example, not only the speech signals of the speaker but also the reverberation, this again has the result that there is offered to the computer 23 by the pulse former 22 a pulse train which now has a very much greater pulse density or pulse frequency. Thus, the computer 23 is now counting in advance of the computer 16, or is counting very much faster than the computer 16. Thus, the computer 23 reaches its counter end state 99 before the computer 16 has reached the counter end state 79. For this reason, a signal is now supplied to the control line 24 for damping the signal feed line to the loudspeaker 13 and simultaneously, via control line 24', with the computer 23 also the computer 16 is returned to zero. In the case of the microphone 10, the reverberation does not operate because for physical reasons the reverberation "fits" only on to the speech amplitude acting as carrier and therefore does not effect more rapid running. Also this result can be predetermined by corresponding design of the pulse former 15.

In this manner, the computer 23 attains its counter end state more rapidly than the computer 16 reaches its counter end state which per se is smaller. As a consequence thereof, the output signal now occurs in the control line 24, the field effect transistor 19 damps the signal feed to the loudspeaker 13 and therewith ends the reverberation. Simultaneously, both counters can be set back to zero.

In the case of the mode of functioning discussed with differing counter end states for the computers 16 and 23, there are only the two extreme possibilities, damping of the signal feed to the loudspeaker 13 or no damping. In practice, frequently gradual transistions between both conditions are desirable. This requirement can also be taken into account. For this purpose, there are employed in the case of the example of embodiment of FIG. 1, for example, two counters for the computer 16 or the computer 23, both of which up to the identical counter state of, for example, 79 issue no signal to the associated control lines. Whereas, however, the computer 16 issues to the control line 17, on reaching a counter end state 79, a signal for automatic returning to zero of the counter 23, there is employed for the computer 23 a counter which, on reaching the counter state 79 does not trigger full damping of the signal supply to the loudspeaker 13 via the field effect transistor 19, but here initiates gradual damping. For this purpose, there is employed for the computer 23 a register having for the counter states 80, 81 82 etc. or the binary signal in each particular instance for each binary output a resistor (not shown), these resistors being connected in parallel with the control electrode of the field effect transistor. Due to this circuit, therefore, on reaching the counter state 80 still extremely high damping of the signal is attained in the control line 24, so that only correspondingly slight damping of the signal supply to the loudspeaker 13 due to the field effect transistor 19 is effected. However, the higher the counter state becomes in the computer 23, the smaller due to the parallel connection of the resistors in the feed line to the field effect transistor 19 via the control line 24 is the damping and correspondingly the stronger is the damping of the signal feed to the loudspeaker 13. Here, therefore, the damping commences gradually and becomes progressively stronger.

If the computer 16 reaches its counter end condition restoring both computers already shortly after commencement of damping, due to a signal in the control line 24, then the damping remains slight. If, however, the computer 16 rapidly follows the computer 23, then also in this case full damping is attained. The damping commences, however, gradually, this being frequently advantageous for practical requirements.

From the above discussions it should have become clear that on restoring the computers 16 and 23 to zero, under all conditions damping of the signal feed to the loudspeaker 13 is briefly interrupted, since the computer 23 only feeds a corresponding damping signal into the control line 24 when it has either reached its counter end condition or exceeds a pre-selected counter condition. However, the computers 16 and 23 are so designed that they reach the indicated counter states in a few milliseconds. Thus, the preceding prevention of damping has only the effect that it is ascertained whether further damping is still necessary at all.

If the computer 23, after setting at zero, operates more rapidly than the computer 16, then damping is immediately again effected. Additionally, it is quite readily possible to connect in the control line 24 to the gate of the field effect transistor 19 also an RC element 25 or the like, forming for the damping control a time constant which is adapted to the full times of the register employed as computer 16 or 23. In this case, when the computer 23 generates an output signal in each counting cycle, due to the effect of the capacitor the necessary permanent damping of the signal feed to the loudspeaker 13 results.

Of course, instead of the field effect transistor it is possible to employ any other variable resistor which can be triggered by an output signal or another mode of damping well-known to the person skilled in the art. Similarly, the person skilled in the art would be well aware of the possibilities for construction of the computers and the associated circuit elements.

A field in which feedback whistle makes special difficulties is those of "free-speaker" telephone installations, here also feedbacks can be avoided with the aid of a computer control system. This is discussed hereinbelow with reference to FIG. 2. Like elements have the same reference numerals as in FIG. 1.

In the case of a "feed-speaker", of course the auxiliary microphone 20 of FIG. 1, which there has only the function of receiving the space sound for control purposes, has become the free-speaker microphone 20'. This serves not only for the control purposes for preventing feedbacks but additionally also—and this is its main function—for converting the sound signals during speech of the user of the free-speaker to output signals which are transmitted to the transfer line. On the other hand, relative to FIG. 1 the microphone of the loudspeaker installation is now replaced by a telephone transformer 26. In the case of free-speakers, for avoiding feedbacks it is a decisive feature that, in the case of signal guiding, in each particular instance in one of the two channels the particular other one of the two channels is damped. Thus, if, for example, the user of the free-speaker speaks via the free-speaker microphone 20', then the signal line to the loudspeaker 13 of the free-speaker must be damped, and vice versa. On the other hand, there must also be a possibility for the user of the free-speaker and the other participant in each particular instance to be allowed once again to enter the line due to intermediate speech, despite the damping of the speech partner.

This function is, in the case of the free-speaker according to FIG. 2, achieved as follows: The signal traveling out of the participant's line 27 to the telephone transformer 26 passes on the one hand to the loudspeaker 13 and on the other hand, digitalized, (pulse former 15) to the computer 16. The sound radiation of the loudspeaker 13 is taken up by the free-speaker microphone 20' and passes therefrom on the one hand via the output amplifier 28 and the telephone transformer 26 into the participator line 27 and on the other hand, digitalized (pulse former 22) to the computer 23. The computers 16 and 23 receive, therefore, in a normal case the same signals but due to the longer travel times the counter state of the computer 23 will always "limp" behind that of the computer 16. Registers having the same counter end state are employed for the computers 16 and 23. This counter end state is, therefore, reached by the counter 16 prior to reaching of the same counter state by the computer 23. The computer 16, therefore, always restores the computer 23 to zero. Simultaneously, however, it supplies also a control signal to the control line 17' and therewith to the field effect transistor 29 which damps the connecting line of the amplifier 21 and of the output amplifier 28 when at its gate a signal is applied from the control line 17'.

In this way, a double effect is achieved. On the one hand, when via the telephone transformer 26 a signal travels in out of the participant's line 27, the speech line of the user of the free-speaker is damped, so that a noise level taken up by the free-speaker microphone 20' does not reach the subscriber's line 27. On the other hand, thereby the radiated sound of the loudspeaker 13 is prevented from being taken up by the free-speaker microphone 20' and therewith from passing into the subscriber's line 27, but above all also via the telephone transformer 26, one again to the loudspeaker 13. Thus, backward feed of this kind is prevented and this also helps in preventing feedback.

Fundamentally, however, the sound taken up by the free-speaker microphone 20' must be employed for control purposes. For this reason, the connecting point of the output amplifier 28 and of the field effect transistor 29 is separated from the connecting point of the amplifier 21 and the pulse former 22 by a resistor 30. In the same manner, also between the connecting point of the pre-amplifier 11 and the pulse former 15 on the one hand and the connecting point of the field effect transistor 31 damping the supply line to the loud-speaker 13 and of the end amplifier 12 up-circuit of the loudspeaker 13 on the other hand, a resistor 32 is connected. The gate of the field effect transistor 31 is connected with the control line 24 into which the computer 23, as in the control line 24', for setting to zero of the computer 16 feeds a signal when it has reached its counter end state.

It was stated hereinabove that the two computers 16 and 23 indicate the same counter and state, for which reason as in the embodiment according to FIG. 1, in the case of the embodiment of the device for preventing feedbacks according to FIG. 2, the computer 16 in the case of control sets the computer 23 at zero. However, if then the user of the free-speaker, during sound radiation of the words of the speech partner, interposes speech through the loudspeaker 13, then the computer 23 receives a pulse train of greater pulse density than the computer 16. It is necessary, in this case, to observe that during the still obtaining damping of the output line due to the field effect transistor 29, this intermediate speech initially does not reach the telephone transformer 26 and therewith, by means of reverse infeed, the computer 16. The computer 23 now runs full more rapidly than does the computer 16 and for its part generates an output signal to the control lines 24 and 24'. Therewith, now, the computer 23 for its part sets the computer 16 at zero (control line 24') and on the other hand transmits a signal damping the signal feed line to the loudspeaker 13 to the gate of the field effect transistor 31. Therewith, there ends the sound radiation due to the loudspeaker 13 and the user of the free-speaker can for his part transmit to the subscriber line. If simultaneously the other subscriber who has ascertained the intermediate speech, terminates his speech, then the entire control system receives signals only on the basis of the speech of the free-speaker user on the free-speaker microphone 20'. Then, however, by reason of the transit times, the computer 16, which also receives the signals fed by the telephone transformer 26, will "limp" behind the computer 23. Therewith, the computer 23 always sets the computer 16 at zero. Of course, already in the case of the first cycle of this type, the damping of the starting line for the field effect transistor 29 is cancelled. Since each syllable can already fill the computers once or even several times, the control system operates so quickly that parts of words are not lost.

Referring to FIG. 2, there is, furthermore, indicated in broken line the possibility of triggering of the field effect transistor 29 by the output signal of the computer 23. In this case, the control line 17' is unnecessary. There is employed for the field effect transistors 29 and 31 in each particular instance a multi-layer switch, these being, however, positively polarized (for example, npnp and pnpn components). The output signal of the computer 23 then constrainedly controls one of the field effect transistors towards the other, this supplying a high degree of functional reliability and excluding feedbacks. With this arrangement, of course, the field effect transistor 29 is effective without control signal as damping element.

In the case of the embodiment discussed hereinabove with reference to FIG. 2, the free-speaker microphone 20' is continuously favored relative to signals entering from the subscriber line 27. This is disadvantageous in the case of free-speakers wherein it is necessary to accept a higher noise level in the space in which the free-speaker is employed. In this case, a calling subscriber would not be able to achieve his object relative to control of the arrangement by the free-speaker microphone 20'.

FIG. 3 shows an embodiment wherein this disadvantage is eliminated by employing a third computer.

For this purpose, at the point of connection of the pre-amplifier 11 with the pulse former 15, via an intermediate amplifier 34 compensating for damping due to the field effect transistor 31 and a pulse former 35, the signal arriving from the telephone transformer 26 is fed to a further computer 36. The computer 23 is so designed that it simultaneously issues the signal damping the signal supply line to the loudspeaker 13, via the control line 24 to the field effect transistor 31, and to the control line 24' with a signal serving for setting to zero of the computer 16. This is effected, for example, at a counter state of 79. In the case of a counter state of 89, the computer 23 supplies to a further control line 37 a signal for setting to zero of the computer 36. On the other hand, the computer 23 is set to zero both when the computer 16 has reached its counter end state, which corresponds to the first signal-generating counter state of the computer 23 (counter state 79), and also when the computer 36 has reached its counter end state of 99 which is larger by 20 than the counter end state of the computer 16 and larger by 10 than the counter end state at which the computer 23 feeds a signal into the control line 37 for setting to zero of the counter 36.

The function is as follows: When the user of the free-speaker speaks, then, in the manner discussed hereinabove with reference to FIG. 2, primarily on the basis of the signals received by the free-speaker microphone 20', the computer 23 operates to a counter state at which it sets the computer 16 to zero via the control line 24' and damps the feed of signals to the loudspeaker 13 via the field effect transistor 31. Due to the setting to zero of the computer 16, damping of the output due to the field effect transistor 29 is cancelled. The signal from the free-speaker microphone 20' passes to the telephone transformer 26 and from the latter travels out not only into the subscriber line 27 but also via the pre-amplifier 11 into the receiver channel. Due to the damping of the receiver channel on the output side of the pre-amplifier 11 by the field effect transistor 31, the latter has, in the computer 16, due to the effect of the pulse former 15 which may be a Schmitt trigger with adjusted amplitude selection, an inadequate effect. The condition remains that the computer 23 reaches the counter end state prior to the computer 16. Thus, the computer 16 continues to be continuously set to zero by the computer 23 and not vice versa. Damping of the input of the computer 16 is, however, cancelled by the computer 36 due to the intermediate amplifier 34, so that the computer 36, due to the identical signals fed back from the free-speaker microphone 20' not only into the computer 23 but also, in the manner described, into the receiver channel, always displays a counter state which is identical with that of the computer 23, or has a slight chronological shift relative thereto. Also the computer 36 is therefore continuously set to zero by the computer 23, for as long as only the user of the free-speaker imposes speech on the free-speaker microphone 20', or there is a higher noise level in the space in which the free speaker is set up.

If, now, however, there travels out of the subscriber line 27, via the telephone transformer 26, into the receiver channel a further signal, during speech of the user of the free-speaker, or the higher noise level continues in the space, then this signal cannot, due to the damping, it is true pass into the computer 16, but can pass into the computer 36 due to the effect, eliminating damping, of the intermediate amplifier 34. Thus, the computer 36 runs more quickly than the computer 23 and reaches its counter end state which is above the counter state necessary for setting to zero of the computer 36 by the computer 23, earlier than the counter 23 reaches its counter end state. Thereby, it is no longer the computer 23 which sets the computer 36 to zero but vice versa, the computer 36 which sets the computer 23 to zero. Therewith, however, once again the output signal in the control line 24 is eliminated and also the damping of the signal feed to the loudspeaker 13. Intermediate speech of the other subscriber connected via the subscriber line 27 with the free-speaker is, therefore, successful; he is once again heard by the user of the free-speaker.

In the case of the embodiment according to FIG. 3, the computer 23 has a double function: On the one hand it must supply a damping signal via the control line 24 to the field effect transistor 31 and simultaneously via the control line 24' supply a setting to zero signal to the computer 16 whereas on the other hand it must somewhat later supply via the control line 37 a set back signal to the computer 36. In practice, however, it is easier to employ two computers having different counter end states, rather than to so construct a computer that it transmits output signals at varying counting states.

FIG. 4 shows, for this reason, an embodiment wherein four computers are employed, the double function of the computer 23 being avoided.

For this purpose, there is connected to the connecting point of the amplifier 21 with the pulse former 22 a supplementary amplifier 38 which cancels out the damping of this point and the output signal of which is fed via a pulse former 39 to a fourth computer 40. The computers 16, 36 and 40 are circularly travelling counters which, on reaching their counter end state, restore themselves to zero if they have not already previously been restored to zero. On the other hand, in the case of this embodiment, there is employed for the computer 23 a full-running counter which does not set itself back automatically, but requires a signal applied to its set back inputs for restoring to zero. This signal is received by the computer 23 either in the manner already discussed several times hereinabove from the computer 16 or from the computer 36 in a manner also already described.

For the computer 36, however, there is now a further difficulty for reaching its counter end state and supplying a restoring signal to the computer 23 inasmuch as it can be set to zero from the computer 40. For example, the computer 40 sets the computer 36 to zero when it has reached the counter state 89, but the computer 36 has hitherto not yet reached the counter state 99. For this reason, the computer 40 will at least always set the computer 36 to zero before the latter has applied an output signal to the computer 23, for the setting to zero thereof, if the computer 40 counts more rapidly than the computer 36. This is the case when the user of the free-speaker speaks, but the subscriber at the other end of the subscriber line 27 does not. If, however, the subscriber at the other end of the subscriber end intercepts with speech, then the computer 36 runs more rapidly than the computer 40 and then for its part, on reaching its counter end state 89, sets the computer 40 to zero. Simultaneously, the computer 36 supplies a signal for restoring to zero to the computer 23. Due to the setting to zero of the computer 23, however, damping of the feed line to the loudspeaker 13 is cancelled by the field effect transistor 31, so that the subscriber does also, in fact, succeed in having his speech be heard.

Since in the case of this mode of operation the computer 23 cannot be a rotating but a fully running counter, in this case the damping to the loudspeaker is not periodically cancelled out. On the contrary, this is effected only when in actual fact the subscriber introduces intermediate speech.

Of course, a similar effect can be achieved in the case of the embodiment according to FIG. 3 by connecting the control electrode of the field effect transistor 31 with an RC element introducing into the damping control system a time constant of the same order of magnitude as the time required for complete running of the computer. In this case also, however, due to the embodiment according to FIG. 4, there is the advantage of simpler construction and mode of operation, since the only computers employed are such as supply an output signal on attaining a fixed counter end position. A further advantage of the computer 40 consists in that, in the event of reverberation, body sound or transit times in the free-speaker housing, when the user of the free-speaker device has not spoken but the subscriber at the other end of the subscriber line 27, and now this subscriber ceases to speak, automatically both the receiver channel and also the transmission channel are rendered free from any kind of damping.

The field effect transistors 19, 29 and 31 are discussed hereinabove as damping elements. For specific employment purposes, especially for wireless communication, for example, in the case of the mobile telephone, it is, however, especially advantageous to employ the field effect transistors direct for switching, especially for change-over of transmission to receiver channels and vice-versa.

Instead of being employed for devices having loudspeakers and microphones, the above-discussed device is very suitable also for line amplifiers operating without these arrangements.

The preceding specific embodiments are illustrative of the practice of the invention. It is to be understood, however, that other expedients known to those skilled in the art of disclosed herein, may be employed without departing from the spirit of the invention or the scope of the appended claims.

We claim:

1. A circuit for preventing acoustic feedback in communication devices provided with at least one microphone, at least one loudspeaker and at least one telephone transformer comprising a signal circuit from and to said telephone transformer wherein the output signal from said telephone transformer fed to the loudspeaker is divided, one divided output signal is fed to at least one first analog-digital converter, the digital output signal of said first converter is supplied to a first counter cooperating with said at least one first converter, the input signal fed from said at least one microphone to said telephone transformer is divided, one divided input signal is fed to at least one second analog-digital converter, the digital output signal of said second converter is supplied to a second counter cooperating with said at least one second converter, at least one of said counters on reaching a predetermined counter state supplying a damping signal to at least one damping element within said signal circuit from and to said telephone transformer and another of said counters on reaching a predetermined counter state supplying a signal to reset the first one of said counters to a zero state, whereby when the input signal exceeds the output signal, the damping element is activated.

2. The circuit of claim 1 wherein said first and second converters comprise a total of two analog-digital converters, each cooperating with a corresponding counter, are employed and the counter supplied with said analog-digital input signal supplies the signal to reset the other counter.

3. The circuit of claim 2 wherein the two counters have the same predetermined counter state.

4. The circuit of claim 2 wherein the predetermined counter state of the counter supplied with said digital output signal is smaller than the predetermined counter state of said counter supplied with said digital input signal.

5. The circuit of claim 1 wherein said at least one microphone actuates said circuit as a hands free telephone.

6. The circuit of claim 5 wherein said first and second converters comprise a total of two analog-digital converters each cooperating with a corresponding counter are employed and both counters supply signals to separate dampening elements as well as signals to reset the other counter to a zero state, where the dampening element triggered by the counter supplied with the digital output signal dampens the input signal between said hands free telephone and said telephone transformer, but not the signal between said hands free telephone and the other counter, and the dampening element triggered by the counter supplied with the digital output signal dampens the signal between said telephone transformer and said loudspeaker but not the signal between said telephone transformer and the other counter.

7. The circuit of claim 6 wherein resistors are connected between each counter input line and each dampening element.

8. The circuit of claim 1 wherein said first and second converters comprise a total of three analog-digital converters each cooperating with a corresponding counter are employed, two of which are supplied by said divided output signal, one after amplification, the counter supplied with said digital input signal supplies the signal to reset the other computers and the counter supplied with the amplified digital output signal on reading a predetermined counter state supplies a signal to reset the counter supplied with said digital input signal to a zero state.

9. The circuit of claim 8 wherein the predetermined counter state number N3 for said counter supplied with the amplified digital output signal has the relationship to the predetermined counter state N2 for said counter supplied with the digital output signal and the predetermined counter state N1 for said counter supplied with the digital input signal of $$N1 \leqq N2 < N3.$$

10. The circuit of claim 1 wherein said first and second converters comprise a total of four analog-digital converters each cooperating with a corresponding counter are employed, two of which are supplied by said divided output signal, one after amplification, and two of which are supplied by said divided output signal, one after amplification, the counter supplied with said amplified digital input signal supplies the signal to reset the counter supplied with said amplified digital output signal, the counter supplied with said digital input signal supplies the signal to reset the counter supplied with said digital output signal and the counter supplied with said amplified digital output signal on reading a predetermined counter state number N3 supplies a signal to reset both counters supplied with said digital input signal to a zero state.

11. The circuit of claim 10 wherein the relationship of the predetermined counter state N3 for said counter supplied with the amplified digital output signal to the predetermined counter state N4 for said counter supplied with the amplified digital input signal, the predetermined counter state N2 for said counter supplied with the digital output signal, and the predeterined counter state N1 for said counter supplied with the digital input signal $$N1 \leqq N2 \leqq N3 < N4.$$

* * * * *